(12) United States Patent
Hanes et al.

(10) Patent No.: US 11,169,955 B2
(45) Date of Patent: Nov. 9, 2021

(54) REMOTE DEVICE CONFIGURATIONS

(71) Applicant: HEWLETT-PACKARD DEVELOPMENT COMPANY, L.P., Spring, TX (US)

(72) Inventors: David H. Hanes, Fort Collins, CO (US); James Glenn Dowdy, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/494,747

(22) PCT Filed: Apr. 5, 2017

(86) PCT No.: PCT/US2017/026153
§ 371 (c)(1),
(2) Date: Sep. 16, 2019

(87) PCT Pub. No.: WO2018/186855
PCT Pub. Date: Oct. 11, 2018

(65) Prior Publication Data
US 2020/0019529 A1 Jan. 16, 2020

(51) Int. Cl.
*G06F 15/177* (2006.01)
*G06F 3/12* (2006.01)
*H04N 1/00* (2006.01)

(52) U.S. Cl.
CPC .......... *G06F 15/177* (2013.01); *G06F 3/1204* (2013.01); *G06F 3/1238* (2013.01);
(Continued)

(58) Field of Classification Search
CPC .... G06F 3/1204; G06F 3/1238; G06F 3/1285; G06F 3/1292; G06F 15/76; G06F 15/177; G06F 9/4405; H04N 1/00411
See application file for complete search history.

(56) References Cited

U.S. PATENT DOCUMENTS

| 6,814,510 | B1 * | 11/2004 | Sabbagh | G06F 3/1204 |
| | | | | 400/61 |
| 7,171,442 | B1 * | 1/2007 | Huang | G06K 15/00 |
| | | | | 358/1.8 |

(Continued)

FOREIGN PATENT DOCUMENTS

| CN | 106371776 A | * | 2/2017 | ......... H04N 1/00411 |
| EP | 1586989 A2 | * | 10/2005 | ........... G06F 3/1228 |

(Continued)

OTHER PUBLICATIONS

How to Print From Your Phone or Tablet, Aug. 1, 2013, < http://www.in.techradar.com/news/computing-components/printers-and-scanners/How-to-print-from-your-phone-or-tablet/articleshow/38764051.cms >.

*Primary Examiner* — Kostas J Katsikis
(74) *Attorney, Agent, or Firm* — Brooks Cameron & Huebsch PLLC

(57) ABSTRACT

In one example, a system for remote device configurations can include a mobile computing device to: determine configuration information for a remote device, generate a configuration file based on a plurality of inputs corresponding to the configuration information of the remote device, transmit the configuration file to the remote device, and the remote device to alter a plurality of settings based on the received configuration file.

14 Claims, 4 Drawing Sheets

(52) U.S. Cl.
CPC .......... *G06F 3/1285* (2013.01); *G06F 3/1292* (2013.01); *H04N 1/00411* (2013.01)

(56) References Cited

U.S. PATENT DOCUMENTS

| | | | | |
|---|---|---|---|---|
| 7,532,339 | B1* | 5/2009 | Beard | G06F 3/1204 358/1.1 |
| 9,007,623 | B2* | 4/2015 | St. Jacques, Jr. | G06F 3/126 358/1.15 |
| 9,110,608 | B2* | 8/2015 | Schultz | G06F 3/126 |
| 9,218,148 | B2 | 12/2015 | Torii | |
| 9,497,338 | B2 | 11/2016 | Lee et al. | |
| 9,503,592 | B2 | 11/2016 | Fein et al. | |
| 9,544,020 | B2 | 1/2017 | Keshavdas et al. | |
| 10,122,872 | B1* | 11/2018 | Shin | H04L 41/0859 |
| 10,360,565 | B2* | 7/2019 | Tehranchi | G06Q 30/018 |
| 10,664,211 | B2* | 5/2020 | Miyaji | G06F 3/1253 |
| 2002/0156951 | A1* | 10/2002 | Beeston | G06F 15/177 710/104 |
| 2004/0203358 | A1* | 10/2004 | Anderson | G06F 3/1204 455/41.1 |
| 2005/0225795 | A1* | 10/2005 | Nuggehalli | G06F 3/1228 358/1.15 |
| 2006/0031543 | A1* | 2/2006 | Motoyama | G06F 3/1236 709/230 |
| 2006/0043166 | A1* | 3/2006 | Matsumoto | G06F 3/1222 235/376 |
| 2006/0227368 | A1* | 10/2006 | Hong | G06F 3/1288 358/1.15 |
| 2007/0047524 | A1* | 3/2007 | Moriya | G06F 3/1204 370/352 |
| 2007/0263236 | A1* | 11/2007 | Selvaraj | G06F 3/1204 358/1.9 |
| 2008/0079286 | A1* | 4/2008 | Ferlitsch | G16H 40/40 296/186.1 |
| 2009/0113061 | A1* | 4/2009 | Tredoux | G06F 3/1284 709/228 |
| 2009/0300148 | A1* | 12/2009 | Gomes | G06F 15/177 709/220 |
| 2010/0027041 | A1* | 2/2010 | Kanno | H04N 1/00965 358/1.13 |
| 2010/0128309 | A1* | 5/2010 | Matoba | H04N 1/00474 358/1.15 |
| 2010/0171973 | A1* | 7/2010 | Kimura | G06F 3/1287 358/1.14 |
| 2011/0075589 | A1* | 3/2011 | Bradley | H04W 48/16 370/254 |
| 2011/0154206 | A1* | 6/2011 | Martin | G06F 3/1203 715/735 |
| 2011/0205581 | A1* | 8/2011 | Machii | H04L 41/082 358/1.15 |
| 2011/0211219 | A1* | 9/2011 | Bradley | H04W 48/16 358/1.15 |
| 2011/0228310 | A1* | 9/2011 | Yanagi | G06F 3/1232 358/1.14 |
| 2012/0033245 | A1* | 2/2012 | Kurahashi | G06F 3/1238 358/1.14 |
| 2012/0154852 | A1 | 6/2012 | Hedberg | |
| 2012/0218576 | A1* | 8/2012 | Sekine | G06F 3/122 358/1.13 |
| 2012/0243029 | A1* | 9/2012 | St. Jacques, Jr. | G06F 3/1292 358/1.15 |
| 2012/0281251 | A1* | 11/2012 | Salgado | G06F 3/1204 358/1.15 |
| 2013/0085968 | A1* | 4/2013 | Schultz | G06F 3/1207 705/400 |
| 2014/0085663 | A1* | 3/2014 | Kavanappillil | G06F 3/1226 358/1.15 |
| 2014/0115492 | A1* | 4/2014 | Tehranchi | G06F 9/451 715/747 |
| 2015/0154484 | A1 | 6/2015 | Iwasaki et al. | |
| 2015/0264198 | A1* | 9/2015 | Kamiya | H04N 1/32122 358/1.13 |
| 2015/0288835 | A1 | 10/2015 | Fein et al. | |
| 2016/0009105 | A1* | 1/2016 | Yamada | G06F 3/1285 347/6 |
| 2016/0014281 | A1* | 1/2016 | Ichiyama | H04N 1/00106 358/1.15 |
| 2016/0054960 | A1* | 2/2016 | Ito | G06F 3/1205 358/1.15 |
| 2016/0147484 | A1* | 5/2016 | Menashe | G06F 3/125 358/1.18 |
| 2016/0358047 | A1* | 12/2016 | Asahara | H04N 1/00509 |
| 2017/0024170 | A1* | 1/2017 | Li | G06F 3/1228 |
| 2017/0034247 | A1 | 2/2017 | Tredoux | |
| 2020/0019529 | A1* | 1/2020 | Hanes | G06F 15/177 |

FOREIGN PATENT DOCUMENTS

EP 2701058 A1 2/2014
JP 2015049862 A * 3/2015

* cited by examiner

REMOTE DEVICE CONFIGURATIONS

BACKGROUND

Devices can perform a plurality of functions. In some examples, the devices can include user interfaces for defining which of the plurality of functions to perform. In some examples, the user interfaces can be utilized to define particular features or specifications for performing the particular function.

For example, a printing device can include a user interface that is physically coupled to the printing device. In some examples, the user interface can be a community user interface that is utilized by a plurality of different users. The community user interface may not be customizable for each of a plurality of users that utilize the user interface. In some examples, the user interface can be utilized to define a number of copies of a print job to perform, as well as define particular features of the print job to be performed.

DETAILED DESCRIPTION

Figure 1:
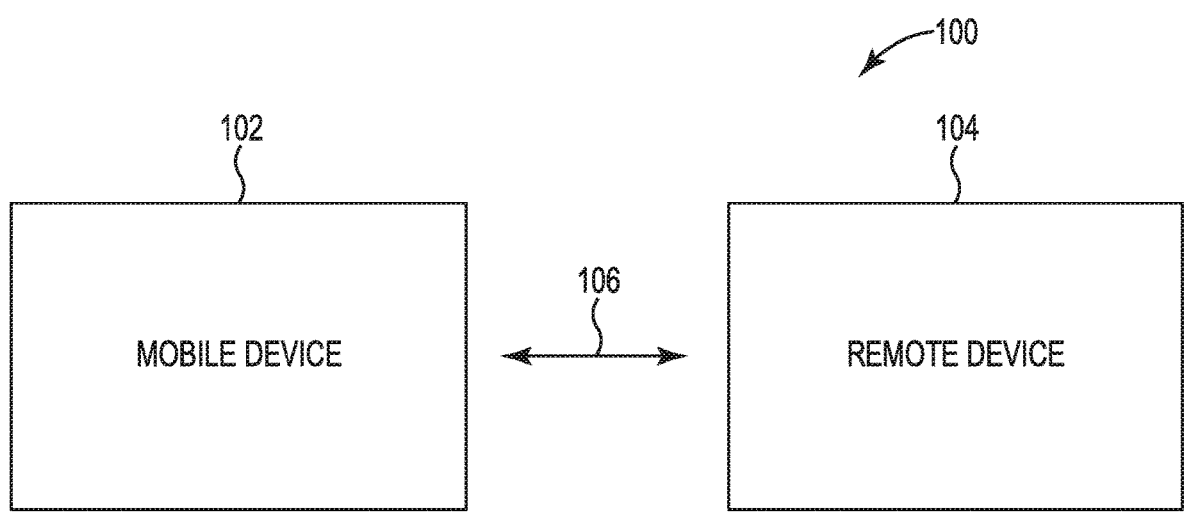
FIG. 1 illustrates an example of a system for remote device configurations consistent with the present disclosure.

A number of systems, devices, and methods for remote device configurations are described herein. In some examples, a system for remote device configurations can include a mobile computing device to: determine configuration information for a remote device, generate a configuration file based on a plurality of inputs corresponding to the configuration information of the remote device, transmit the configuration file to the remote device, and the remote device to alter a plurality of settings based on the received configuration file. In some examples, the mobile computing device can be a smart phone, tablet, and/or other type of mobile device. In some examples, the remote device can be a printing device, a multi-function printing device, and/or other type of device that can be utilized to perform functions.

In some examples, a remote device can include a user interface that can be displayed on a display coupled to the remote device. In some examples, the user interface can be unfamiliar or more difficult to utilize compared to a user interface of a user's mobile device. For example, a particular function of the remote device can be difficult to perform utilizing the user interface of the remote device. In addition, the display of the remote device can be physically coupled to the remote device and can be difficult for a user to utilize the particular function when the user is at a remote location.

The remote device configurations described herein can utilize a user interface of a mobile computing device to transmit instructions to a remote device for performing a plurality of functions via the remote device. In some examples, the mobile device can utilize configuration information for the remote device to generate a user interface with a plurality of selections that correspond to the remote device. For example, the configuration information for the remote device can include a plurality of selectable inputs that correspond to inputs that can be displayed on a user interface of the remote device. In this example, the mobile device can display the selectable inputs and generate a configuration file for a particular function based on selected inputs.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a system 100 for remote device configurations consistent with the present disclosure. In some examples, the system 100 can include a mobile device 102 and a remote device 104. In some examples, the mobile device 102 can have a communication link 106 with the remote device 104. In some examples, the communication link 106 can be a wireless communication link (e.g., near field communication (NFC), Bluetooth®, local area network (LAN) connection, wide area network (WAN) connection, etc.).

In some examples, the mobile device 102 can include a mobile computing device. For example, the mobile device 102 can include, but is not limited to, a smart phone, a tablet, and/or a laptop computing device. In some examples the remote device 104 can be a remote peripheral device. For example, the remote device 104 can be a printing device, fax machine, server, multifunction printing device, among other types of peripheral devices for a computing device.

As described herein, the remote device 104 can include a user interface that is physically coupled to the remote device 104. In some examples, the user interface of the remote device 104 can be relatively more difficult to navigate in order to instruct the remote device 104 to perform particular functions. For example, the remote device 104 can be a device that is utilized by a plurality of different users. In this example, preferences of an individual user may not be stored on the remote device 104. Thus, in some examples, preferences of a user interface and/or stored data that is particular to a user may not be stored on the remote device 104, which can make it more difficult to navigate and/or more difficult to enter data for a particular function to be performed by the remote device 104.

In some examples, the mobile device 102 can determine configuration information of the remote device 104. In some examples, the mobile device 102 can generate a user interface for the remote device 104. The user interface for the remote device 104 can include a plurality of selectable inputs for performing a plurality of functions via the remote device. For example, when the remote device 104 is a multifunction printing device, the plurality of selectable inputs can include, but are not limited to, paper size selectable inputs, dual sided page inputs, quantity of copies input, an email address copy input, fax number input, title input, among other inputs that are utilized by a multifunction printing device.

In some examples, the mobile device 102 can utilize user profile data and/or stored data to complete the plurality of selectable inputs. For example, the mobile device 102 can store preferences for a user that can be reused at a subsequent interaction, making the generated user interface for the remote device 104 relatively easier to navigate compared to a user interface physically coupled to the remote device 104. In another example, the mobile device 102 can utilize an address book stored on the mobile device 102 to input email addresses and/or fax numbers into the selectable inputs. In this example, it can be easier to retrieve the contact information for a user from the mobile device 102 than using the user interface of the remote device 104 to insert the same contact information.

In some examples, the mobile device 102 can utilize the inputs of the generated user interface for the remote device 104 to generate a configuration file. As used herein, a configuration file can include a description of a particular function to be performed by the remote device 104. In some examples, the description can include preferences defined by the plurality of selectable inputs. In some examples, the configuration file can include instructions that are executed by the remote device 104 to perform a particular function defined by the configuration file. In some examples, the configuration file generated by the mobile device 102 can be transmitted to the remote device 104 via the communication link 106.

In some examples, the remote device 104 can receive the generated configuration file and can alter settings based on the inputs of the configuration file. In some examples, the altered settings can be settings of a particular function to be performed. For example, the altered settings can be print settings or device settings for performing the particular function. In some examples, the configuration file can include instructions for performing the particular function. For example, the configuration file can include instructions that can be executed by a processor of the remote device 104 to perform the particular function defined by the plurality of selectable inputs of the mobile device 102.

The system 100 can utilize a mobile device 102 to generate a user interface for a remote device 104 based on configuration information for the remote device 104. A plurality of inputs can be provided on the mobile device 102 via the generated user interface. The mobile device 102 can generate a configuration file based on the plurality of inputs and transmit the configuration file to the remote device 104 via communication link 106. The system 100 can provide a user interface generated by the mobile device 102 that can utilize user preferences and/or user data stored on the mobile device 102. In some examples, the stored user preferences and/or user data can make inputting data for particular functions of the remote device 104 easier to navigate and execute compared to a user interface utilized by the remote device 104.

Figure 2:
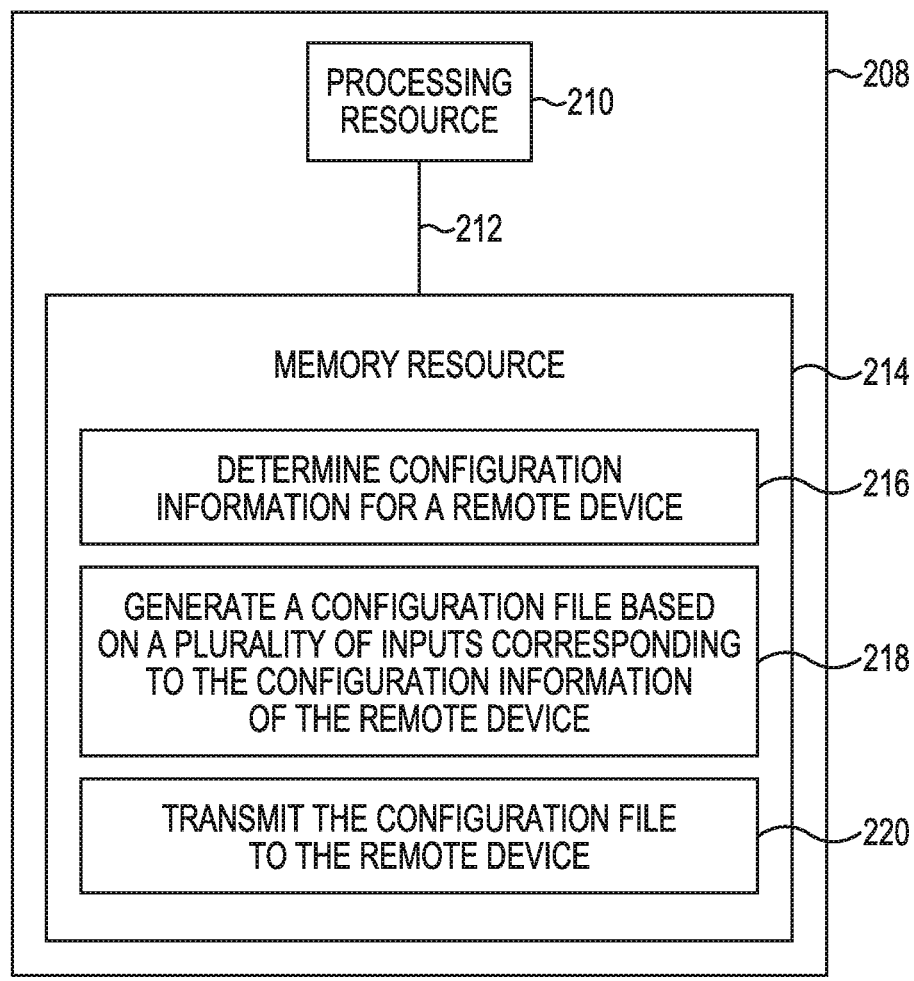
FIG. 2 illustrates an example of a mobile device for remote device configurations consistent with the present disclosure.

FIG. 2 illustrates an example of a mobile device 202 for remote device configurations consistent with the present disclosure. In some examples, the mobile device 202 can be the mobile device 102 as referenced in FIG. 1. For example, the mobile device 202 can be a smart phone and/or tablet device as described herein. In some examples, the mobile device 202 can include a memory resource 214 that can be utilized to store instructions 216, 218, 220 that can be executed by a processing resource 210 to perform functions described herein.

A processing resource 210 may be a central processing unit (CPU), microprocessor, and/or other hardware device suitable for retrieval and execution of instructions stored in memory resource 214. In some examples, the processing resource 210 can be coupled to the memory resource 214 via a connection 212. Connection 212 can be a physical or wireless communication connection. In the particular example shown in FIG. 2, processing resource 210 may receive, determine, and send instructions 216, 218, 220. As an alternative or in addition to retrieving and executing instructions 216, 218, 220, processing resource 210 may include an electronic circuit comprising a number of electronic components for performing the operations of the instructions 216, 218, 220 in the memory resource 214. With respect to the executable instruction representations or boxes described and shown herein, it should be understood that part or all of the executable instructions 216, 218, 220 and/or electronic circuits included within one box may be included in a different box shown in the figures or in a different box not shown.

Memory resource 214 may be any electronic, magnetic, optical, or other physical storage device that stores executable instructions 216, 218, 220. Thus, memory resource 214 may be, for example, Random Access Memory (RAM), an Electrically-Erasable Programmable Read-Only Memory (EEPROM), a storage drive, an optical disc, and the like. The executable instructions 216, 218, 220 may be stored on the memory resource 214. Memory resource 214 may be a portable, external or remote storage medium, for example, that allows the system to download the instructions 216, 218, 220 from the portable/external/remote storage medium. In this situation, the executable instructions 216, 218, 220 may be part of an "installation package". As described herein, memory resource 214 may be encoded with executable instructions 216, 218, 220 for remote device configurations as described herein.

In some examples, the memory resource 214 can include instructions 216 to determine configuration information for a remote device. In some examples, the instructions 216 to determine configuration information for the remote device can include receiving the configuration information directly from the remote device. For example, the mobile device 202 can include a communication link with a remote device. In this example, the remote device can transmit the configuration information via the communication link. Thus, in some examples, the mobile computing device 202 can determine the configuration information based on information received from the remote device. In some examples, the mobile device 202 can download the configuration information from a database or cloud database. In some examples, the configuration information can be provided by a manufacturer and/or obtained from a manufacturer of the remote device.

In some examples, the configuration file can define functions that can be performed by the remote device, a plurality of inputs to alter settings associated with the functions that can be performed by the remote device, and/or a plurality of inputs to alter general settings or other types of settings of the remote device. For example, the configuration file can include a description of features that can be accessed via a user interface of the remote device. In these examples, the configuration file can be utilized to generate a custom user interface that corresponds to the remote device.

In some examples, the configuration file can include a plurality of selectable inputs to define parameters for a particular function to be performed by the remote device. In some examples, the custom user interface for the remote device can be stored by the mobile device 202 for subsequent function requests for the remote device. In some examples, the configuration file can mimic a user interface of the remote device. For example, the configuration file can include the same or similar selectable inputs as the user interface of the remote device.

As described herein, the user interface generated by the mobile device 202 can include a plurality of functions that can be performed by a particular remote device. In some examples, the plurality of functions can be the same or similar functions provided by a user interface coupled to the particular remote device. In some examples, the mobile device 202 can receive inputs via the generated user interface that define specifications for a function to be performed by the remote device. For example, the user interface generated by the mobile device 202 can include selectable inputs for a printing device to define specifications for a particular print job or other function provided by the printing device.

In some examples, the memory resource 214 can include instructions 218 to generate a configuration file based on a plurality of inputs corresponding to the configuration information of the remote device. In some examples, the mobile device 202 can utilize the inputs selected via the generated user interface to generate the configuration file. For example, the configuration file can include a description of the function to be performed by the remote device.

In some examples, the configuration file can include an input for a plurality of inputs that correspond to the configuration information of the remote device. For example, the remote device may utilize a plurality of inputs to identify a function to be performed. In this example, there may be a threshold number of inputs that are utilized by the remote device to identify a function to be performed. In some examples, a portion of the plurality of inputs can include predefined inputs. In these examples, the user interface generated by the mobile device 202 can include the predefined inputs based on the configuration information. In some examples, the user interface generated by the mobile device 202 can include inputs for altering the predefined inputs such that a portion of the plurality of inputs can be saved for subsequent utilization. For example, the mobile device 202 can duplicate the configuration file to define parameters for each of a plurality of corresponding functions to be performed by the remote device.

In some examples, the memory resource 214 can include instructions 220 to transmit the configuration file to the remote device. In some examples, the mobile device 202 can transmit the configuration file to the remote device via a wireless connection. In some examples, the wireless connection can be near field communication (NFC) connection with the remote device.

In some examples, the configuration file can alter a plurality of settings of the remote device based on the plurality of inputs described within the configuration file. In some examples, the configuration file can include instructions that can be executed by the remote device to alter the plurality of settings of the remote device. In some examples, the plurality of settings can be settings of the remote device and/or settings corresponding to a particular function to be performed by the remote device. For example, the plurality of settings can include device settings that are separate from a particular function being performed (e.g., settings related to stored preferences for the device, energy saving settings of the remote device, etc.) or the plurality of settings can be specific to the particular function being performed (e.g., quantity of copies to be printed, email address for a particular email to be sent, fax number for a particular fax to be sent, etc.).

In some examples, the mobile device 202 can be utilized to generate a user interface for a remote device based on configuration information for the remote device. As described herein, the generated user interface for the remote device can be relatively easier to navigate compared to a user interface coupled to the remote device. In some examples, the generated user interface can utilize stored information from the mobile device 202 to provide a plurality inputs. For example, email addresses and/or other types of contact information can be utilized for providing the plurality of inputs. In some examples, the generated user interface can be stored for the mobile device 202 with user preferences for subsequent use. Thus, the generated user interface can provide a custom user interface for the remote device based on user preferences.

Figure 3:
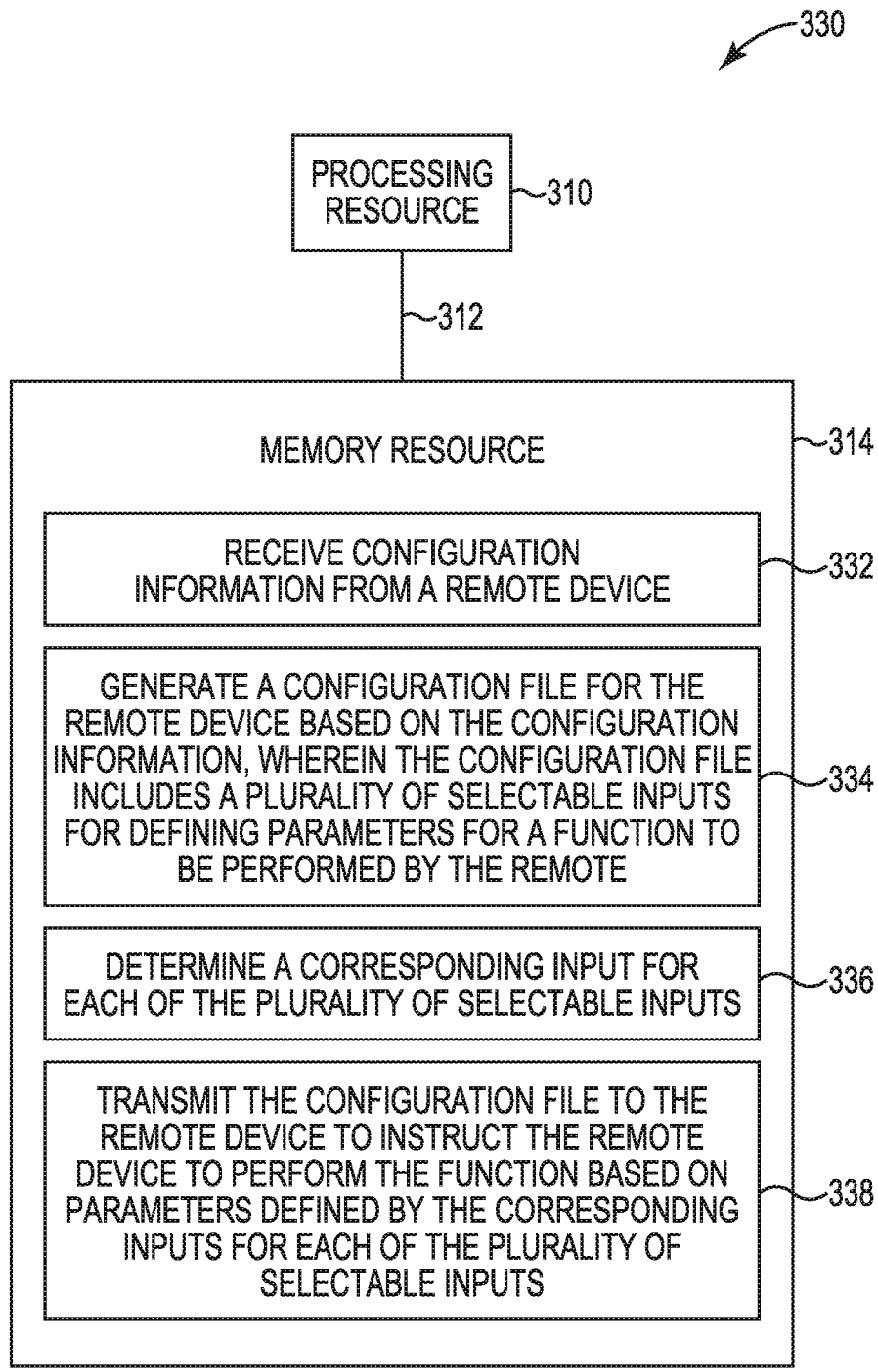
FIG. 3 illustrates an example of a system for remote device configurations consistent with the present disclosure.

FIG. 3 illustrates an example of a system 330 for remote device configurations consistent with the present disclosure. In some examples, the system 330 can include a memory resource 314 that can be utilized to store instructions 332, 334, 336, 338 that can be executed by a processing resource 310 to perform functions described herein. In some examples, the processing resource 310 can be coupled to the memory resource 314 via a connection 312. Connection 312 can be a physical or wireless communication connection.

A processing resource 310 may be a central processing unit (CPU), microprocessor, and/or other hardware device suitable for retrieval and execution of instructions stored in memory resource 314. In the particular example shown in FIG. 3, processing resource 310 may receive, determine, and send instructions 332, 334, 336, 338. As an alternative or in addition to retrieving and executing instructions 332, 334, 336, 338, processing resource 310 may include an electronic circuit comprising a number of electronic components for performing the operations of the instructions 332, 334, 336, 338 in the memory resource 314. With respect to the executable instruction representations or boxes described and shown herein, it should be understood that part or all of the executable instructions 332, 334, 336, 338 and/or electronic circuits included within one box may be included in a different box shown in the figures or in a different box not shown.

Memory resource 314 may be any electronic, magnetic, optical, or other physical storage device that stores executable instructions 332, 334, 336, 338. Thus, memory resource 314 may be, for example, Random Access Memory (RAM), an Electrically-Erasable Programmable Read-Only Memory (EEPROM), a storage drive, an optical disc, and the like. The executable instructions 332, 334, 336, 338 may be stored on the memory resource 314. Memory resource 314 may be a portable, external or remote storage medium, for example, that allows the system 330 to download the instructions 332, 334, 336, 338 from the portable/external/remote storage medium. In this situation, the executable instructions 332, 334, 336, 338 may be part of an "installation package". As described herein, memory resource 314 may be encoded with executable instructions 332, 334, 336, 338 for remote device configurations as described herein.

In some examples, the memory resource 314 can include instructions 332 to receive configuration information from a remote device. As described herein, the configuration information can include information relating to settings and/or functions provided by the remote device. For example, the configuration information can include information relating to features provided or inputs provided by a user interface physically coupled to the remote device.

In some examples, the configuration information can be information that can be utilized to generate a user interface for the remote device. For examples, the configuration information can include information for setting options, function options, and/or other inputs that can be provided to a user interface of the remote device. In some examples, a request for configuration can be transmitted to the remote device and the remote device can respond with the configuration information.

In some examples, the memory resource 314 can include instructions 334 to generate a configuration file for the remote device based on the configuration information, wherein the configuration file includes a plurality of selectable inputs for defining parameters for a function to be performed by the remote device. In some examples, the configuration file can be generated based on the plurality of selectable inputs that define parameters or settings for a function to be performed by the remote device. For example, the configuration file can be generated based on selections from a user interface generated by the mobile device based on the configuration information.

In some examples, the configuration file can include instructions and/or inputs that correspond to inputs of a user interface coupled to the remote device. For example, the generated user interface can include similar inputs to the inputs of the user interface coupled to the remote device. In this example, each of the plurality of selectable inputs of the generated user interface may not directly correspond to inputs of the user interface coupled to the remote device. In this example, the generated configuration file can be utilized to convert the selectable inputs from the generated user interface to inputs that correspond to the inputs of the user interface coupled to the remote device.

In some examples, the memory resource 314 can include instructions 336 to determine a corresponding input for each of the plurality of selectable inputs. As described herein, the generated user interface can include a plurality of inputs that correspond to functions or settings of the remote device, but may be different than a plurality of inputs of the user interface coupled to the remote device. In these examples, the selectable inputs from the generated user interface can be mapped to inputs of the user interface coupled to the remote device. In these examples, the selectable inputs from the generated user interface can include corresponding inputs of the user interface coupled to the remote device.

In some examples, the memory resource 314 can include instructions 338 to transmit the configuration file to the remote device to instruct the remote device to perform the function based on parameters defined by the corresponding inputs for each of the plurality of selectable inputs. In some examples, the configuration file can include information and/or instructions to instruct the remote device to perform a particular function based on the parameters defined by the selectable inputs. In some examples, the configuration file can provide inputs that correspond to inputs of a user interface coupled to the remote device.

Figure 4:
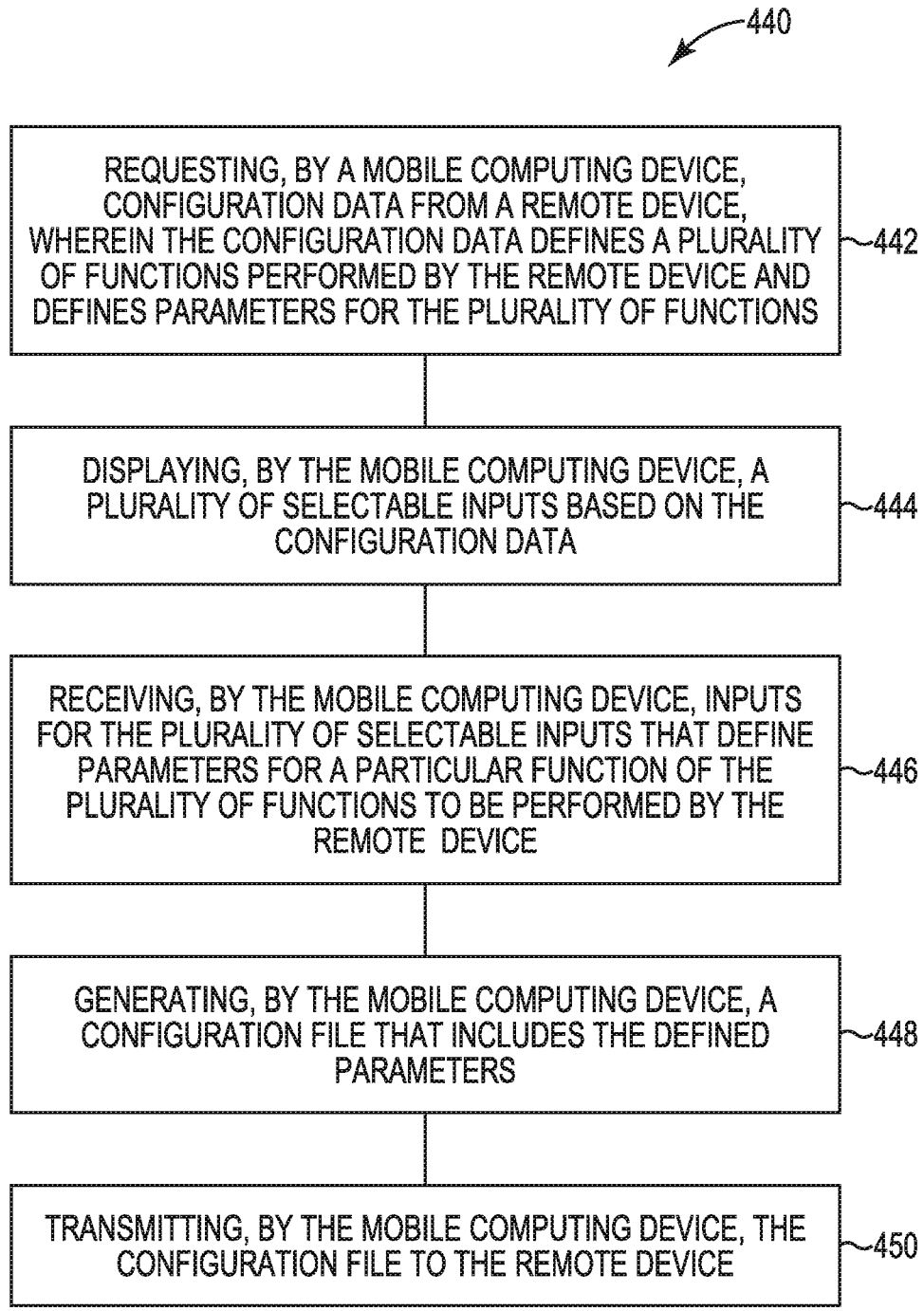
FIG. 4 illustrates an example of a method for remote device configurations consistent with the present disclosure.

FIG. 4 illustrates an example of a method 440 for remote device configurations consistent with the present disclosure. In some examples, the method 440 can be performed by one or more computing devices. For example, the method 440 can be performed by a mobile device and/or a remote device as described herein. For example, the mobile device and/or the remote device can include a processing resource coupled to a memory resource to execute instructions as described herein.

At block 442, the method 440 can include requesting, by a mobile computing device, configuration data from a remote device, wherein the configuration data defines a plurality of functions performed by the remote device and defines parameters for the plurality of functions. In some examples, the mobile computing device can request the configuration data or configuration information directly from the remote device and/or a remote database that includes information about the remote device. As described herein, the configuration data (e.g., configuration information, etc.) can include a plurality of selectable inputs that correspond to particular functions that can be performed by the remote device. As described herein, the remote device can be a peripheral device for a computing device. For example, the remote device can be a printing device or multifunction printing device.

In some examples, the configuration data can be utilized to generate a user interface for the remote device. In some examples, the generated user interface can be displayed on the mobile device. In some examples, the generated user interface can appear as the same user interface for a plurality of different remote devices. For example, the generated user interface for a first remote device may appear the same or similar as a generated user interface for a second remote device. In this example, generating a user interface that appears the same, but may include different inputs (e.g., additional inputs, fewer inputs, etc.) based on the configuration data can enable a user to more easily navigate a plurality of inputs for a plurality of different remote devices more easily compared to navigating each of the user interfaces coupled to each corresponding remote device.

In some examples, the generated user interface can be based on a type of remote device. For example, remote devices that are printing devices can be categorized as printing devices and user interfaces generated for printing devices can appear the same or similar with different inputs that correspond to the particular printing device. In this example, remote devices that are fax devices can be categorized as fax devices and user interfaces generated for fax devices can appear the same or similar with different inputs that correspond to a particular fax device. In this way, a user can more easily navigate a familiar user interface without having to learn a new user interface for each remote device.

At block 444, the method 440 can include displaying, by the mobile computing device, a plurality of selectable inputs based on the configuration data. In some example, displaying the plurality of selectable inputs can include generating and displaying a user interface that includes the plurality of selectable inputs. In some examples, the mobile computing device can include a display that can be utilized to display the user interface that includes the plurality of selectable inputs. For example, the mobile computing device can generate a graphical user interface (GUI) based on the configuration data. In this example, the GUI can include the plurality of selectable inputs.

At block 446, the method 440 can include receiving, by the mobile computing device, inputs for the plurality of selectable inputs that define parameters for a particular function of the plurality of functions to be performed by the remote device. As described herein, the mobile device can receive inputs that correspond to each of the plurality of selectable inputs. For example, a user can utilize a GUI displayed on the mobile computing device to select an input for each of the plurality of selectable inputs. In some examples, the selectable inputs can be utilized to define the parameters of a particular function performed by the remote device. For example, the parameters can include settings of the device and/or specifications for a particular function to be performed. For example, the parameters can include, but are not limited to, quantity of copies, double sided, single sided, color, black and white, pages to be printed, among other parameters when the remote device is a printing device.

At block 448, the method 440 can include generating, by the mobile computing device, a configuration file that includes the defined parameters. When the inputs for the plurality of selectable inputs have been received by the mobile computing device, the mobile computing device can generate a configuration file. As described herein, the configuration file can include information and/or instructions for performing the particular function with the particular defined parameters. In some examples, the configuration file can include a mapping to particular inputs of the remote device.

At block 450, the method 440 can include transmitting, by the mobile computing device, the configuration file to the remote device. As described herein, the configuration file can be transmitted to the remote device via a connection link. In some examples, the connection link can be a wireless connection such as NFC. In some examples, the mobile device can be utilized in place of utilizing a user interface coupled to the remote device. As described herein, a user interface of the mobile device can be relatively easier to navigate compared to the user interface coupled to the remote device.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system, comprising:
a mobile computing device comprising a processor to:
determine configuration information for a remote device;
generate a user interface for the remote device to be displayed on the mobile computing device based on user profile data, wherein the user interface includes a plurality of inputs based on the configuration information and user information stored by a memory resource of the mobile computing device;
receive a selection of a portion of the plurality of inputs and a selection of user information, wherein the user information includes contact information stored on the mobile computing device that is utilized with the user interface;
generate a configuration file based on a selected portion of the plurality of inputs and selected user information;
transmit the configuration file to the remote device;
store the user interface associated with the remote device to be utilized for a plurality of different remote devices that provide functions associated with the plurality of inputs of the user interface; and
the remote device to alter a plurality of settings based on the received configuration file.

2. The system of claim 1, wherein the plurality of different remote devices include different remote devices with different inputs.

3. The system of claim 1, wherein the plurality of inputs are selectable inputs that define parameters for a particular function to be performed by the remote computing device and the plurality of different remote devices.

4. The system of claim 3, wherein the configuration file instructs the remote device to perform the particular function with selected parameters defined by the plurality of selectable inputs.

5. The system of claim 1, wherein the profile data includes preferences for a user associated with the profile data to complete the plurality of selectable inputs.

6. A non-transitory machine readable storage medium having stored thereon machine readable instructions to cause a computer processor to:

receive configuration information from a remote device;
generate a user interface for the remote device to be displayed on a mobile computing device based on user profile data, wherein the user interface includes a plurality of inputs based on the configuration information and user information stored by the mobile computing device;
receive a selection of a portion of the plurality of selectable inputs and a selection of user information, wherein the user information includes contact information stored on the mobile computing device that is utilized with the user interface;
generate a configuration file for the remote device based on the configuration information, the selected portion of the plurality of selectable inputs, and the selected user information, wherein the configuration file includes the plurality of selectable inputs for defining parameters for a function to be performed by the remote device;
determine a corresponding input for each of the plurality of selectable inputs;
transmit the configuration file to the remote device to instruct the remote device to perform the function based on parameters defined by the selected portion of the plurality of selectable inputs and the selected user information; and
store the user interface associated with the remote device to be utilized for a plurality of different remote devices that provide functions associated with the plurality of inputs of the user interface, wherein the plurality of different remote devices include different functions than the remote device.

7. The medium of claim 6, wherein the plurality of selectable inputs are printer settings that define parameters of a print job to be performed by the remote device when the remote device is a printing device.

8. The medium of claim 6, wherein the configuration file is transmitted to the remote device via a near field communication (NFC) connection with the remote device.

9. The medium of claim 6, wherein the configuration file is stored and utilized for a category of remote devices that includes the remote device.

10. The medium of claim 6, wherein the corresponding inputs are stored for generating additional configuration files for the remote device.

11. A method, comprising:
requesting, by a mobile computing device, configuration data from a remote device, wherein the configuration data defines a plurality of functions performed by the remote device and defines parameters for the plurality of functions;
displaying, by the mobile computing device, a plurality of selectable inputs based on the configuration data and user information stored by the mobile computing device, wherein the user information includes contact information stored on the mobile computing device that is utilized with a user interface displayed by the mobile computing device;
receiving, by the mobile computing device, inputs for the plurality of selectable inputs that define parameters for a particular function of the plurality of functions to be performed by the remote device and a selection of user information;
generating, by the mobile computing device, a configuration file that includes the defined parameters and the selected user information;

transmitting, by the mobile computing device, the configuration file to the remote device; and storing, by the mobile computing device, the user interface associated with the remote device to be utilized for a plurality of different remote devices that provide functions associated with the plurality of inputs of the user interface, wherein the plurality of different remote devices are categorized with the remote device and include fewer functions than the remote device.

12. The method of claim 11, wherein displaying the plurality of selectable inputs includes displaying particular selectable inputs based on the particular function of the remote device selected and the stored user information.

13. The method of claim 11, comprising generating a profile for the remote device that includes the plurality of selectable inputs for the remote device, wherein the profile is utilized for the plurality of different remote devices that are in a same category as the remote device.

14. The method of claim 13, wherein the profile for the remote device includes historic data of functions performed by the remote device with corresponding inputs for the plurality of selectable inputs.

\* \* \* \* \*